(12) United States Patent
Watanabe et al.

(10) Patent No.: US 7,074,028 B2
(45) Date of Patent: Jul. 11, 2006

(54) INJECTION MOLDING MACHINE HAVING A FREELY ROTATABLE SCREW

(75) Inventors: Hiroshi Watanabe, Fujiyoshida (JP); Shingo Komiya, Tsuru (JP)

(73) Assignee: Fanuc LTD, Yamanashi (JP)

( * ) Notice: Subject to any disclaimer, the term of this patent is extended or adjusted under 35 U.S.C. 154(b) by 398 days.

(21) Appl. No.: 10/743,072

(22) Filed: Dec. 23, 2003

(65) Prior Publication Data

US 2004/0142056 A1   Jul. 22, 2004

(30) Foreign Application Priority Data

Jan. 17, 2003   (JP) .............................. 2003-009350

(51) Int. Cl.
*B29C 45/77*   (2006.01)
(52) U.S. Cl. ..................... 425/145; 264/40.3
(58) Field of Classification Search ................ 425/145, 425/559; 264/40.3
See application file for complete search history.

(56) References Cited

U.S. PATENT DOCUMENTS

| 4,695,237 | A | 9/1987 | Inaba |
| 4,879,077 | A | 11/1989 | Shimizu et al. |
| 5,002,717 | A | 3/1991 | Taniguchi |
| 6,733,265 | B1 * | 5/2004 | Schmidt ..................... 425/145 |
| 2001/0053392 | A1 | 12/2001 | Suganuma et al. |

FOREIGN PATENT DOCUMENTS

| JP | 51-73563 | 6/1976 |
| JP | 60-076321 | 4/1985 |
| JP | 62-060621 | 3/1987 |
| JP | 63-227316 | 9/1988 |
| JP | 3-092321 | 4/1991 |
| JP | 4-201225 | 7/1992 |
| JP | 6-071706 | 3/1994 |
| JP | 11-170319 | 6/1999 |
| JP | 2000-000858 | 1/2000 |

OTHER PUBLICATIONS

Patent Abstracts of Japan of JP 06071706, published Mar. 15, 1994.
Patent Abstracts of Japan of JP 07195461, published Aug. 1, 1995.
Patent Abstracts of Japan of JP 2001030316, published Feb. 6, 2001.

* cited by examiner

*Primary Examiner*—Tim Heitbrink
(74) *Attorney, Agent, or Firm*—Staas & Halsey LLP

(57) ABSTRACT

By starting injection, resin pressure in front of the check valve is raised, and the check ring moves backward. Pressure of resin accumulated between flights of the screw prevents the check ring from moving backward, and the screw is kept freely rotatable to thereby make the backward speed of the check ring faster. Therefore, the check ring is brought into tight contact with the check seat quickly to close the resin path. Thereafter, the rotation of the screw is fixed, reduced pressure in the injection/dwell causes the screw to rotate in a normal direction, and prevents the resin from being pressed toward the front of the check valve.

14 Claims, 7 Drawing Sheets

INJECTION MOLDING MACHINE HAVING A FREELY ROTATABLE SCREW

BACKGROUND OF THE INVENTION

1. Field of the Invention

The present invention relates to an in-line screw type injection molding machine, and more particularly to a check valve mechanism provided at the tip end of a screw, for preventing resin from flowing backward.

2. Description of the Related Art

An injection molding machine obtained by providing one screw with functions of plasticizing (melting) material, kneading and injection is referred to as an in-line screw type injection molding machine. In ordinary cases, the in-line screw type injection molding machine has a check valve mechanism, at the tip end of the screw, for preventing resin during injection from flowing backward. FIG. 1 shows an example of this check valve mechanism. In a portion reduced in the diameter between a screw head 2 provided at the tip end of a screw 1 and the body portion of the screw 1, there is arranged a check ring 3 so as to be moveable in a direction of a screw axis, and further on the body side of the screw 1 of this reduced-in-diameter portion, there is arranged a check seat 4 for closing a resin path by abutting upon and being brought into tight contact with this check ring 3.

Resin pellets to be supplied from behind the screw 1 are melted by means of shearing heat to be generated by the rotation of the screw 1 and heat from a heater provided in the outside of a barrel in which the screw 1 is inserted. The resin thus melted raises resin pressure behind the check ring 3 to cause a force for pressing the check ring 3 toward the front. When the check ring 3 is pressed toward the front, the resin in the rear passes through a clearance between the check ring 3 and the reduced-in-diameter portion, and flows in front of the check ring 3 to raise pressure within the barrel in front of the screw head 2.

When pressure in front of the check ring 3 exceeds predetermined pressure (back pressure), the screw 1 is pressed toward the rear and the pressure in front of the check ring 3 is reduced. Further, the screw 1 is rotated, whereby pressure behind the check ring 3 becomes higher than the pressure in front of the check ring 3, and therefore, continuously-molten resin is fed toward the front of the check ring 3. When the screw 1 retreats up to a predetermined amount, the rotation of the screw is stopped.

Next, an injection process starts. When the screw 1 advances in order to fill up resin, resin pressure accumulated in front of the screw head 2 is raised, and therefore, the check ring 3 retreats, and is brought into tight contact with the check seat 4 to close the resin path. Filled-up pressure prevents the molten resin from flowing backward in a screw retreat direction. When there fluctuates timing whereat the check ring 3 retreats to close the resin path, an amount of resin to be filled also fluctuates so that molding becomes unstable.

The check valve mechanism during injection is closed when the pressure in front of the check valve mechanism becomes higher than the pressure in the rear because of an advance of the screw 1, and in the rear of the check valve mechanism immediately before injection as described above, there is residual pressure in a grooved portion 6 between flights 5. There is a problem that closing timing fluctuates under the influence of this residual pressure. Thus, there have been proposed various methods such as means capable of closing the check valve mechanism for each cycle with stability and a method for determining timing whereat the check valve mechanism actually closes, and controlling an injection process on the basis of the timing thus obtained.

For example, there have been known a method (See Japanese Patent Application Laid-Open No. 4-201225) by which a pressure sensor is added within a cylinder, closing of the check valve is detected on the basis of a change in pressure during the advance of the screw, and a point in time of closing thereof is used as a starting point of an injection stroke, a method (See Japanese Patent Application Laid-Open No. 3-92321) of detecting a position of a ring valve by taking advantage of electrostatic capacity, a method (See Japanese Patent Application Laid-Open No. 51-73563) by which the closing of the check valve is detected by detecting leading edge of injection pressure at the commencement of injection to control an injection stroke from the detection position, and the like.

Also, there have also been known a method (See Japanese Patent Application Laid-Open No. 62-60621) of closing the check valve by reversing the screw forcibly or by releasing the fixation to close the check valve concurrently with the commencement of injection, and a method (See Japanese Patent Application Laid-Open No. 11-170319) by which in order to prevent the screw from reversing at the commencement of injection, the brake is applied to start injection, and after the check valve is closed, the brake is released, whereby wear is reduced to extend the screw life.

Further, there have been proposed various methods by which after the completion of metering before injection is started, resin residual pressure in a groove portion of the flight portion is reduced, whereby the check valve is caused to close concurrently with the commencement of injection. For example, there have been known a method (See Japanese Patent Application Laid-Open No. 2000-858) of reducing pressure in the flight portion by reversing the screw after the termination of metering, and a method (See Japanese Patent Application Laid-Open No. 60-76321) of closing the check valve by performing preliminary injection to control the injection process on the basis of a screw position after this preliminary injection. Also, there is also known a method (See Japanese Patent Application Laid-Open No. 6-71706) by which an injection screw is brought into a freely rotatable state for injection, and closing of the check valve is facilitated by rotation of the injection screw.

In order to detect, by an increase in resin pressure, that the check valve mechanism is closed, it is necessary to add a pressure sensor, and there is a problem that the mechanism will become complicated. Also, in the method of reducing the pressure before the commencement of injection after completion of metering, there is a defect that control for this pressure reduction process becomes complicated.

Also, in the method of reversing the screw, described in the Japanese Patent Application Laid-Open No. 6-71706, since an amount of inverse rotation is adjusted by a mechanical part of an engaging protrusion of a spline ring to be installed, there is a problem that the structure becomes complicated. Also, in the method of performing the inverse rotation by releasing the fixation of screw rotation concurrently with the commencement of injection, described in the Japanese Patent Application Laid-Open No. 62-60621, since the screw rotation remains released at all times during injection/dwell, there is a problem that when pressure at the tip end of the screw has been reduced while the dwell pressure is controlled, the screw rotates in a normal direction, resin is supplied toward the front, and the amount of fill-up fluctuates.

SUMMARY OF THE INVENTION

A first aspect of an in-line screw type injection molding machine according to the present invention comprises: screw rotation stop detection means for bringing a screw into a freely rotatable state from the commencement of injection and detecting, after the injection, that the rotation of screw has stopped; and screw position detection means for detecting the position of the screw when the screw rotation stop detection means detects a stop of rotation. Further, the injection molding machine of this aspect can assume the following form:

The injection molding machine may comprise further screw position correction means for correcting, on the basis of a screw position detected by the screw position detection means, the screw position that has been set in order to control an injection process.

The injection molding machine may comprise further setting means of arbitrarily setting timing whereat the screw is brought into a freely rotatable state.

The injection molding machine may comprise further means for limiting, to one direction, a direction of rotation of a screw which is brought into a freely rotatable state.

The injection molding machine may comprise further means for setting, to an arbitrary value, torque of rotation of the screw when it has been brought into the freely rotatable state.

A second aspect of an in-line screw type injection molding machine according to the present invention comprises: means for bringing a screw into a freely rotatable state from the commencement of injection; and means for fixing the rotation of screw again after the screw has been brought into a freely rotatable state. The injection molding machine of this aspect can assume the following form:

There is provided means for arbitrarily setting timing whereat the screw is brought into the freely rotatable state and timing whereat the rotation of screw is fixed again.

There is provided means for limiting, to one direction, a direction of rotation of a screw which is brought into a freely rotatable state.

There is provided means for setting, to an arbitrary value, torque of rotation of a screw when it has been brought into the freely rotatable state.

According to the present invention, it is possible to simply detect closing timing of a check valve provided at the tip end of the screw of the injection molding machine in order to prevent resin during injection from flowing backward. Also, it is possible to inhibit closing timing of the check valve from fluctuating under the influence of residual pressure in the screw flight portion after the termination of metering, and to obtain stable injection control.

BRIEF DESCRIPTION OF THE DRAWINGS

The above and other objects and features of the present invention will be apparent from description of the following examples by referring to the accompanying drawings. Of those drawings.

DESCRIPTION OF THE EMBODIMENTS

FIGS. 2 to 6 are principle explanatory views of the present invention.

Figure 1:
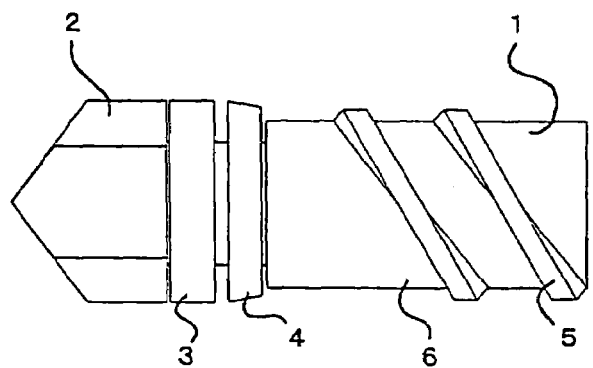
FIG. 1 shows an example of a check valve mechanism to be provided at a screw of an injection molding machine.
Figure 2:
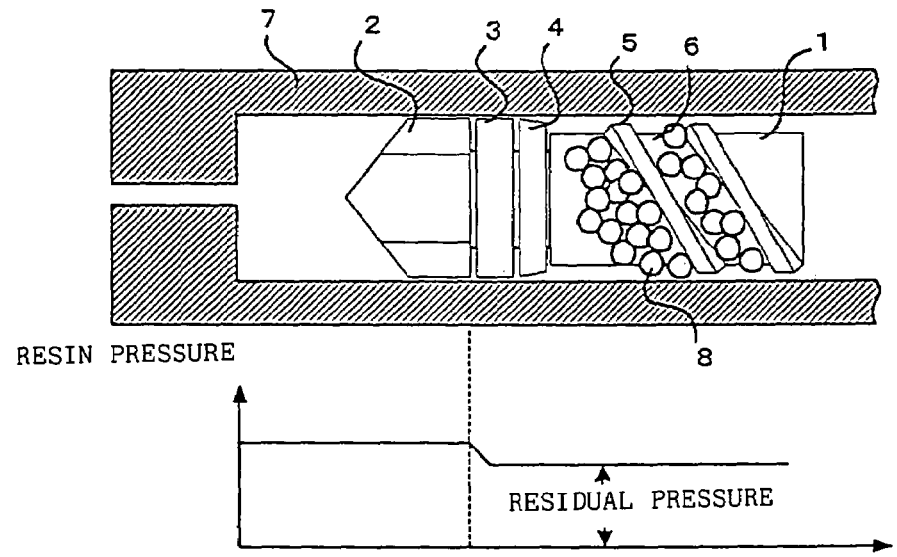
FIG. 2 is a view showing a state of the check valve mechanism after the termination of metering.
Figure 3:
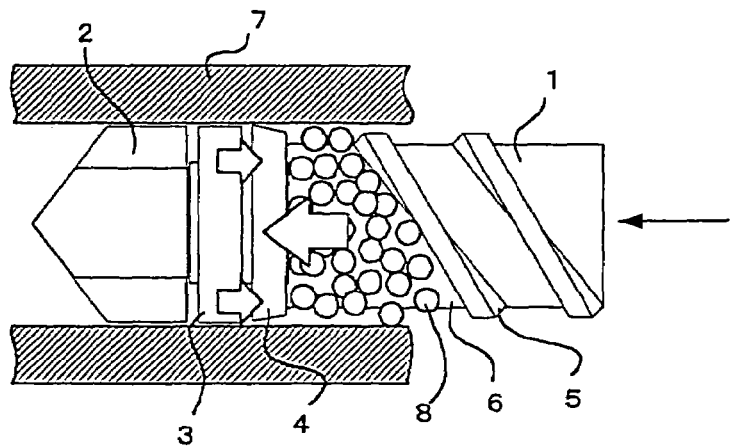
FIG. 3 is an explanatory view for illustrating a phenomenon in which backward movement of a check ring is delayed due to pressure of resin accumulated in a groove portion between flights of the screw.

FIG. 2 is a view showing a state of the check valve mechanism after the termination of metering; and within a barrel 7 at the tip end of a screw head 2, there is stored molten resin; a difference between pressure of the stored molten resin and pressure of resin remaining in a groove portion 6 between flights 5 of the screw 1 is small, whereby the check ring 3 of the check valve mechanism is in an unstable position. When the screw 1 is caused to advance for injection from such a state, in a stage in which pressure in front of the check valve mechanism becomes higher than pressure of resin existing in the groove portion 6 between flights 5 in the rear due to filled-up pressure, the check ring 3 moves backward to be brought into tight contact with the check seat 4 so that the resin path is closed. When at this commencement of injection, the rotation of the screw 1 is stopped and the screw 1 is moved in the axial direction in a fixed state for injection, due to pressure of resin accumulated in the groove portion 6 between flights 5, the backward movement of the check ring 3 is delayed as shown in FIG. 3. Depending upon magnitude of the pressure of resin accumulated in the groove portion 6 between flights 5, closing timing of the check valve fluctuates. This affects an amount of fill-up of resin to be filled within the mold, and affects quality of the molded product.

Figure 4:
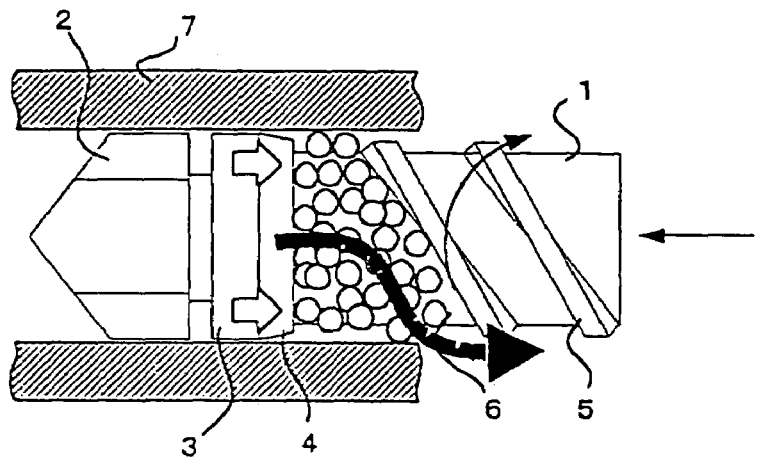
FIG. 4 is an explanatory view of the principle, in which the screw is kept freely rotatable at the commencement of injection, whereby backward movement of the check ring is facilitated to close a resin path quickly.

Thus, in the present invention, the screw 1 is kept freely rotatable at the commencement of injection as shown in FIG. 4. In order to make the screw freely rotatable, in the case of a motor-driven injection molding machine, power supply for the screw rotating motor will be cut off or the current value will be limited. On the other hand, in the case of a hydraulic injection molding machine, the hydraulic circuit for the screw rotational driving will be released.

When the screw 1 advances and the resin pressure in front of the screw head 2 becomes higher, this pressure is to be applied to the resin between flights 5 behind the check valve mechanism. The resin between flights 5 applies a force in a backward direction to the flights 5 in an attempt to move backward. Since the screw 1 has been held in a freely rotatable state, the screw 1 itself rotates to facilitate backward movement of this resin. This facilitates backward movement of the check ring 3 and the check valve mechanism is to be closed immediately after the commencement of injection.

Figure 5:
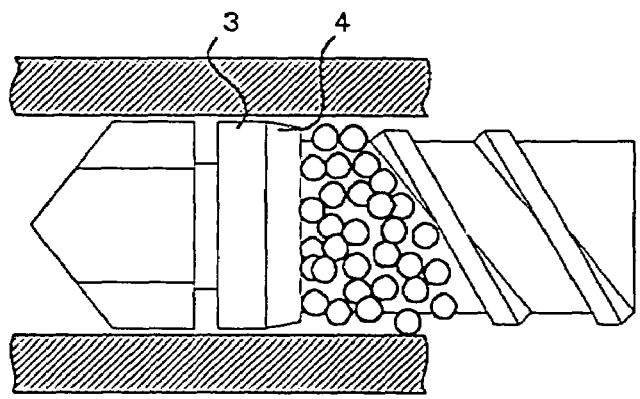
FIG. 5 is an explanatory view for illustrating a state in which the check ring moves backward to be brought into tight contact with a check seat and the resin path is closed.

If the check ring 3 moves backward and is brought into tight contact with the check seat 4 to close the resin path as shown in FIG. 5, the pressure of resin in front of the screw head 2 will not act on the resin accumulated in the groove portion 6 between flights 5 of the screw 1. Therefore, the rotation of the screw 1 will stop. In other words, an amount of rotation and speed of this screw 1 are naturally determined by filled-up pressure, fill-up (injection) speed, and the resin pressure in the groove portion 6 between flights 5, and it is not necessary to set in advance. A point of time whereat the rotation of this screw 1 has stopped is detected, it is judged that at the time of detection, closing has been made by the check valve mechanism, and on the basis of a position (moving position of the screw 1 in the direction of injection) of the screw 1 at that time, preset values of control parameters such as an injection speed switching position of injection control and a switching position to dwell will be corrected.

Figure 7:
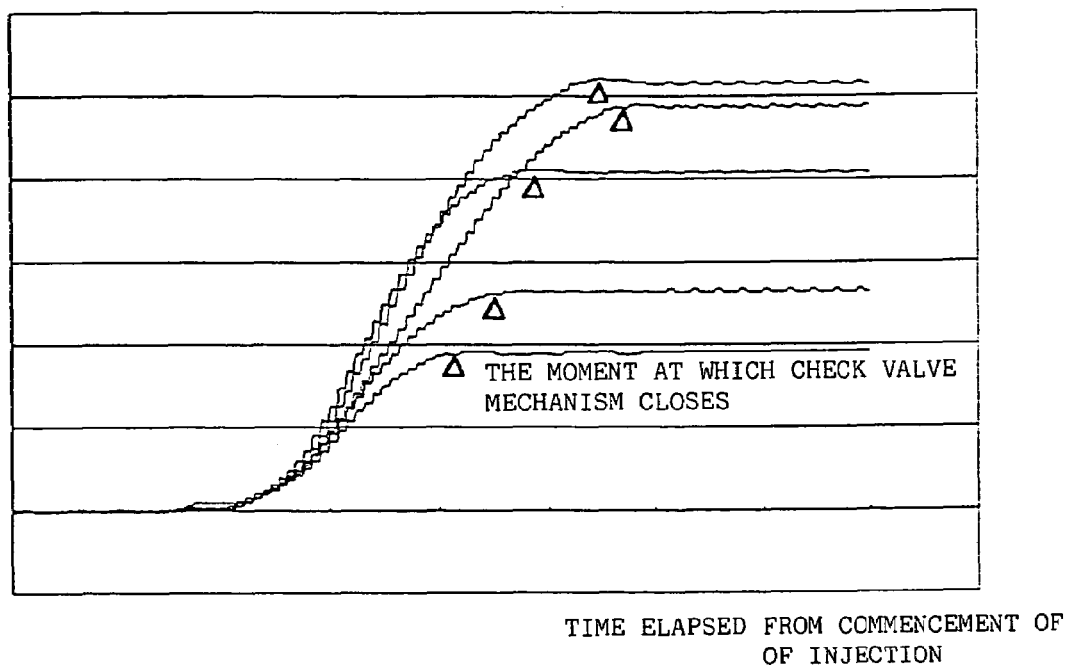
FIG. 7 is a view showing an experimental result obtained by measuring an amount of rotation from the commencement of injection to stop of the screw rotation when screw rotation is made free and injection is conducted with type of resin and molding conditions varied during injection.

FIG. 7 shows an experimental result obtained by measuring an amount of rotation from the commencement of injection to stop of the screw rotation when screw rotation is made free for injection during injection with type of resin and molding conditions varied. It can be seen that each of points indicated by marks Δ is detected as a point of time whereat the screw rotation has stopped so that the check valve mechanism has closed the resin path.

Figure 6:
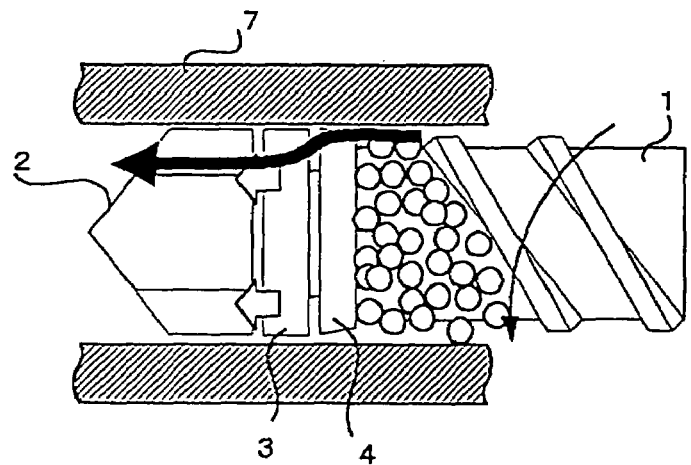
FIG. 6 is an explanatory view in which when pressure of injection/dwell is reduced in an injection/dwell process, the screw is kept freely rotatable, whereby molten resin passes through a portion of the check ring to be supplied to the tip end of the screw.

After the check valve mechanism has closed the resin path, the pressure of resin in front of the screw head 2 will not act on the resin accumulated in the groove portion 6 between flights 5. However, since pressure control has been operated during an injection/dwell process, there may be cases where pressure at the tip end of the screw is reduced depending upon the molding condition. In the case of this reduced pressure, pressure of resin accumulated in the groove portion 6 between flights 5 act to press the check ring 3 out toward the front. In this case, when the screw 1 is kept freely rotatable, the screw 1 rotates in a normal direction as shown in FIG. 6 so that molten resin accumulated in the groove 6 portion between flights 5 passes through a portion of the check ring 3 to be supplied to the tip end of the screw. Then, since the amount of fill-up becomes unstable, it is necessary to fix the screw rotation at arbitrary timing from the commencement of injection. For the fixation of the screw rotation, it may be possible to fix the screw rotation in both directions (forward and reverse), or to fix only the forward rotation. In the case of the motor-driven injection molding machine, when fixed in both directions (forward and reverse), feedback control of a rotational position of the screw rotating motor is performed, and the screw 1 is fixed so as to hold it at a command position. Also, when only the direction of forward rotation is fixed, it may be possible to perform current limiting of the screw rotating motor only in the reverse rotation direction and not to rotate in the forward direction.

Figure 8:
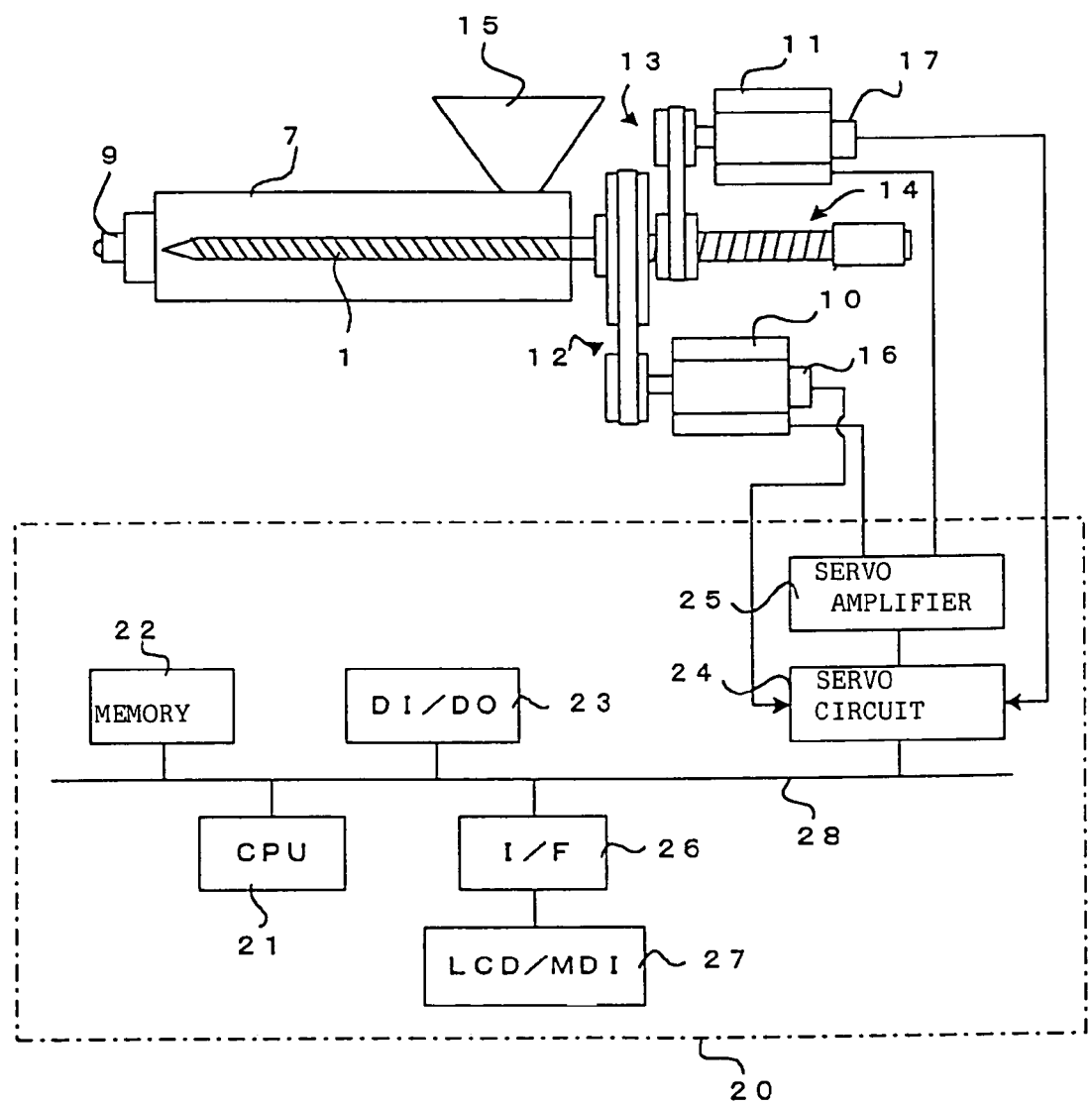
FIG. 8 is a block diagram of principal part according to an embodiment of the present invention.

FIG. 8 is a block diagram of principal part showing an embodiment of the present invention.

At the tip end of a barrel 7 in which the screw 1 has been inserted, there is installed a nozzle 9, and at the rear end of the barrel 7, there is mounted a hopper 15 for supplying resin pellets in the barrel 7. The screw 1 is adapted to be rotationally driven by a metering servo motor 10 through a transmission mechanism 12, and further, the screw 1 is constructed so as to be driven in the axial direction by a conversion mechanism 14, which converts rotational motion of a transmission mechanism 13, ball threads/nuts and the like into rectilinear motion by a servo motor 11 for injection, for being injection- and back pressure-controlled. To the metering servo motor 10 and the servo motor 11 for injection, there are mounted position/speed detecting devices 16, 17 for detecting the rotational position and speed respectively, and a rotational speed, a position in the axial direction and moving speed (injection speed) of the screw 1 are adapted to be able to be detected by these position/speed detecting devices.

To a control unit 20 for controlling this injection molding machine, there are connected: a memory 22 constructed by ROM, RAM and the like which are connected to a processor 21 through bus 28; an input/output circuit 23 to be connected to various sensors and an actuator of the injection molding machine; a servo circuit 24 for controlling servo motors for each control axis in the injection molding machine such as a metering servo motor 10 and a servo motor for injection 11; and an interface 26.

To the interface 26, there is connected a manual data entry unit with liquid crystal display 27. Through the use of this manual data entry unit with liquid crystal display 27, current limited values and the like of the metering servo motor 10 to be described later in the direction of forward rotation and in the direction of reverse rotation are set in advance. Also, the servo circuit 24 is constructed by a processor, a memory and the like, and controls position, speed and the like of the servo motors for driving each axis of the injection molding machine. The servo circuit 24 drives individual axes of servo motors through a servo amplifier 25. Also, position and speed feedback signals to be fed back from the position/speed detection device installed to each servo motor are taken in the servo circuit 24, and feedback control of the position and speed is performed. In this respect, FIG. 8 shows only the metering servo motor 10 and the servo motor for injection 11. In this respect, the structure of such injection molding machine as described above is the same as that of the conventional motor-driven injection molding machine.

Figure 9:
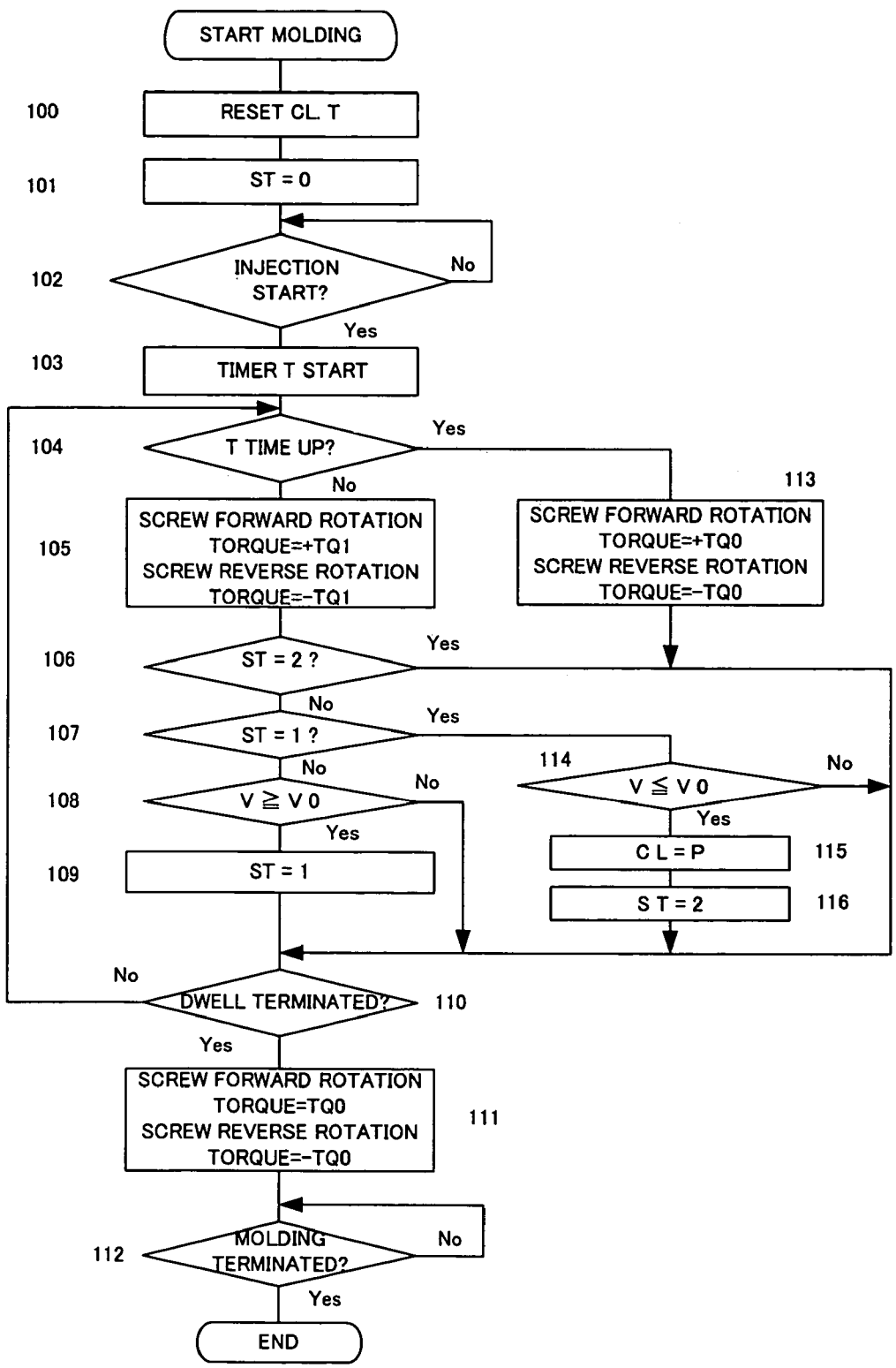
FIG. 9 is a flow chart showing an injection molding operation according to the embodiment of the present invention.

FIG. 9 is a flow chart showing an injection molding operation according to the present invention that the processor 21 according to this embodiment performs.

When a molding operation is started, a register for storing a position CL of the check valve mechanism closing screw, and a timer T are first reset (step 100), and a screw rotation commencement detection flag ST is set to "0" (step 101). Thus, waiting for commencement of injection (step 102), when the injection is started, the timer T in which a time when limit of a current value of the metering servo motor (servo motor for screw rotation) 10 is to be released has been set is started (step 103).

Next, it is judged whether or not the timer T has counted up a preset time (step 104), and if the timer T has not counted up, current limited values in the direction of forward rotation and in the direction of reverse rotation of the metering servo motor which rotates in the direction of forward rotation and in the direction of reverse rotation of the screw is set to a preset small value (value substantially close to 0) "+TQ1", "−TQ1" (step 105). Thereby, since driving current for driving the metering servo motor is to be retained to be "+TQ1", "−TQ1" that has been set or less, the metering servo motor 10 and the screw 1 which is rotationally driven by the metering servo motor 10 enter a freely rotatable state.

Next, it is judged whether or not the screw rotation commencement detection flag ST is "2" (step 106), and if it is not "2", it is judged whether or not it is "1" (step 107). If it is not "1" either, it is judged whether or not rotating speed V of the metering servo motor 10 to be detected by the position/speed detecting device 16 exceeds a preset rotating speed V0 (step 108). Since at first, the screw rotation commencement detection flag ST is "0" and the metering servo motor 10 is in a stopped state or moves slightly, the rotating speed V does not reach the preset value V0. In this case, the processor 21 judges whether or not the dwell is completed (step 110), and if not completed, the sequence returns to step 104. Hereinafter, until the rotating speed V of the metering servo motor 10 exceeds the preset rotating speed V0, processing of those steps 104 to 108 and step 110 is repeatedly carried out.

When injection is started, the servomotor 11 for injection is driven to cause the screw 1 to advance, and injection of molten resin accumulated in front of the screw head 2 within the mold from the nozzle 9 is started, pressure of this molten resin urges the check ring 3 of check valve mechanism the toward the rear as described above. Also, it urges the resin accumulated in the groove portion 6 between flights 5 of the screw 1, and since driving current of the metering servo motor 10 which rotates the screw 1 is a small value "+TQ1", "−TQ1", the screw 1 is in a freely rotatable state, and the resin accumulated in the groove portion 6 between flights 5 urges the flights 5 of the screw 1 to rotate the screw 1. When the rotating speed of this screw 1 exceeds the preset value V0, this is detected in step 108 and the screw rotation commencement detection flag ST is set to "1", that is a value indicating that the screw is rotating (step 109), and the sequence proceeds to step 110 and return to step 104. Since the screw rotation commencement detection flag ST has been set to "1", processing in steps 104, 105 and 106 is carried out and sequence proceeds to step 114 from step 107.

In step 114, it is judged whether or not the rotating speed V of the metering servo motor 10 is equal to or lower than the preset rotating speed V0. If not equal to or lower than the preset rotating speed V0, the sequence returns to step 110. Hereinafter, until the rotating speed V of the metering servo motor 10 to be detected by the position/speed detecting device 16 becomes equal to or lower than the preset rotating speed V0, processing in steps 104 to 107, step 114 and step 110 is repeatedly carried out.

When the check ring 3, being urged by the resin to move backward, is brought into tight contact with the check seat 4 and the resin path is closed, no force is applied to the flights 5 of the screw 1. Therefore, the rotation of the screw 1 is stopped. Thus, when the rotating speed of the screw 1 becomes equal to or lower than the preset value V0, the sequence proceeds from step 114 to step 115 to read a current position (indicates an injection position in the axial direction of the screw) P of the screw 1 that has been obtained on the basis of a feedback signal of a position from the position/speed detecting device 17 for storing as the position CL of the check valve closing screw. Also, this position CL of the check valve closing screw is also displayed on a display unit 27. Thus, the screw rotation commencement detection flag ST is set to "2" that indicates that the check valve has been closed (step 116) and sequence proceeds to step 110.

After the screw rotation commencement detection flag ST has been thus set to "2", until the timer T counts up a preset time, processing in steps 104, 105 and 106 (judgment is Yes because the screw rotation commencement detection flag ST is "2"), processing in steps 110 and 104 is repeatedly carried out.

Thus, when the timer T counts up the preset time (step 104), by releasing a torque limit on the metering servo motor 10 for rotating the screw 1, its limited value will be returned to the maximum driving current value "+TQ0" and "−TQ0" so as to allow the full torque to be outputted, and at this time, position deviation of a position loop for controlling the metering servomotor 10 is set to "0" (step 113). Hereinafter, until the dwell is completed, processing in steps 104, 113 and 110 is repeatedly carried out.

After the timer T counts up the preset time, a current limited value of the metering servo motor becomes the maximum value, and no moving command has been outputted to the metering servo motor. Therefore, the metering servomotor 10 operates so as to hold its rotating position, and stops the rotation of the screw 1 for fixing.

When the dwell is thus completed (step 110), the current limited value of the metering servo motor 10 is set to the maximum driving current value "+TQ0", "−TQ0" again (step 111) to wait completion of molding (step 112).

The foregoing is operation processing of the present embodiment. Within a predetermined time period after the commencement of injection, the screw 1 is held so as to be freely rotatable as described above. As a result, when the check ring 3 of the check valve mechanism moves backward, the screw 1 is reversed by filled-up pressure due to the injection to facilitate the backward movement of the check ring 3, and the check ring 3 is brought into tight contact with the check seat 4 and the resin path is closed. Then, the position P of the screw 1 at that time is stored and displayed as the position CL of the check valve closing screw.

The position CL of the check valve closing screw thus obtained is utilized for injection control in the injection process as has been conventionally preformed.

Figure 10:
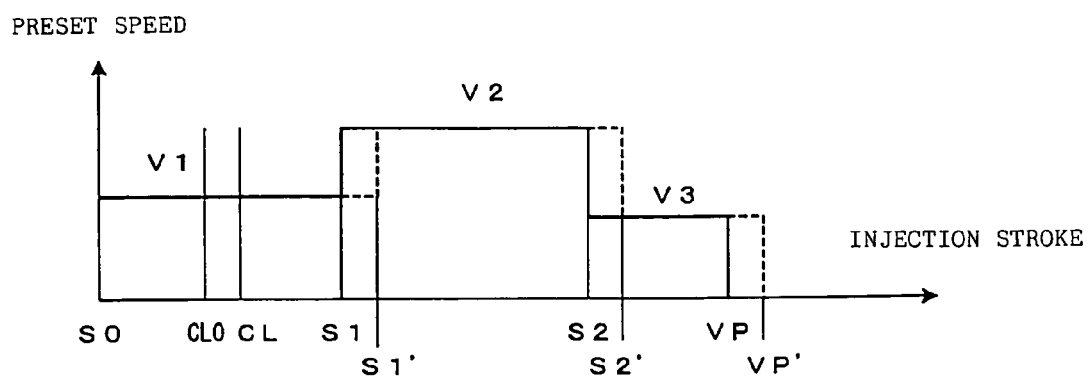
FIG. 10 is an explanatory view concerning a switching position of injection speed in injection control, setting of a switching position to dwell, and correction thereof.

FIG. 10 is an explanatory view concerning a switching position of injection speed in injection control, setting of a switching position to dwell, and correction thereof. An abscissa represents an injection stroke and an ordinate represents injection speed. It is assumed to have been set such that injection is started from an injection commencement screw position S0 at injection speed V1, the injection speed is switched to V2 at a screw position S1, further the injection speed is switched to V3 at a screw position S2, and it is switched to the dwell at a screw position VP. In this respect, CL0 is a position of the check valve closing screw during an injection process that becomes a reference. This screw position CL0 is determined on the basis of an average value of positions of the check valve closing screw in plural molding cycles in such a state that molding is stabilized by adjusting the molding conditions and the molded product satisfies quality requested.

Thus, when this reference check valve closing screw position CL0 is set in advance and a molding cycle is started, the processor 21 detects a check valve closing screw position CL by the processing shown in FIG. 9, and determines deviation ΔCL in the closing screw position of the check valve mechanism from the detected value CL and the reference check valve closing screw position CL0 that has been set.

$$\Delta CL = CL - CL0 \tag{1}$$

The deviation ΔCL thus determined is added to each speed switching screw position and the dwell switching screw position that have been set for correction, whereby positions S1', S2' and VP' are determined, and the injection speed is switched at the corrected screw position S1', S2' thus determined and it is switched to dwell control at the corrected dwell switching position VP'.

$$S1'=S1+\Delta CL$$

$$S2'=S2+\Delta CL$$

$$VP'=VP+\Delta CL$$

In other words, it can be regarded that molten resin starts to be actually injected in the mold when the check valve mechanism has closed the resin path. For this reason, if each speed switching position or a dwell switching position is corrected by a position deviation $\Delta CL$ with respect to the reference check valve closing screw position CL0, actual switching to the injection operation or dwell control will realize an injection process substantially same as an injection process that becomes a reference where a good molded product has been obtained.

In the above-described embodiment, a current limited value of the metering servo motor for rotating the screw after a lapse of a predetermined time counted by the timer T from the commencement of injection has been set to "+TQ0" and "−TQ0" being the maximum values. But it may be possible to set a current limited value of the metering servo motor to a limited value being a small value, "+TQ1", "−TQ1" at the time of commencement of injection without providing this timer T in advance, and to set the current limited value of the metering servo motor to "+TQ0" and "−TQ0" being the maximum value for locking the screw rotation when the check valve is closed and the screw rotation commencement flag ST is set to "2" (step 116 in FIG. 9).

Also, at the commencement of injection, in order to reduce the resistance of resin in such a manner that the check ring 3 of the check valve mechanism moves backward quickly to be brought into tight contact with the check seat 4, reverse rotation of the screw 1 can be allowed. Therefore, for the current limited value of the metering servo motor, only one in the direction of reverse rotation may be set to a small current limited value "−TQ1". For example, in the example of FIG. 9, in step 105, it may be set that screw reverse rotation torque=−TQ1.

Also, after the check valve is once closed, the resin pressure in front of the check valve mechanism becomes lower than the resin pressure in the rear because of reduced pressure or the like so that the screw 1 rotates forward to press the check ring toward the front. Thus, in order to prevent the resin accumulated in the groove portion 6 between flights 5 from being fed forward of the check valve, the screw rotation is locked. Therefore, in order to prevent the screw 1 from rotating in the direction of forward rotation, the current limited value of the metering servo motor in the direction of forward rotation can be set to "+TQ0" being the maximum value (for example, in the example shown in FIG. 9, in step 113, it may be set that screw reverse rotation torque=+TQ1).

Also, depending upon the molding condition, when reduced pressure or the like does not take place in the injection and dwell processes, further when, even if there may be reduced pressure, it is negligible, screw rotation may be freely retained during the injection process. In this case, in the flow chart of FIG. 9, there is no need for processing in steps 103, 104 and 113.

Also, there may be cases where after the termination of metering, the screw 1 is caused to move backward by an arbitrary distance in order to reduce the resin pressure in front of the screw head 2, and in this case, since in the next injection process, there is not generated any force for the resin in front of the screw head 2 to press the check ring 3 in the backward direction while the screw 1 advances by a distance corresponding to the reduced pressure, it is not necessary to all the screw to rotate freely. For this reason, after the screw 1 reaches an arbitrary position from the commencement of injection, or after a lapse of an arbitrary time period from the commencement of injection, the screw rotation may be made free.

Further, since the screw 1 is rendered freely rotatable at the time of injection to quickly close the resin path by the check valve mechanism, in case where it is not necessary to carry out a correction based on a closing screw position of the check valve mechanism, or before a continuous molding operation, the screw rotation is made freely rotatable for injection, and the closing screw position CL is detected and displayed in advance. Thus, this closing screw position CL, or an average value of screw positions detected and displayed is determined, and this average value is defined as the closing screw position CL. Then, on the basis of this detected closing screw position CL, a switching position of injection speed in injection control, a switching position to dwell and the like is set. If so performed, during a continuous molding operation, what is required is to merely render the screw 1 freely rotatable, so that it is not necessary to detect closing of the check valve.

Figure 11:
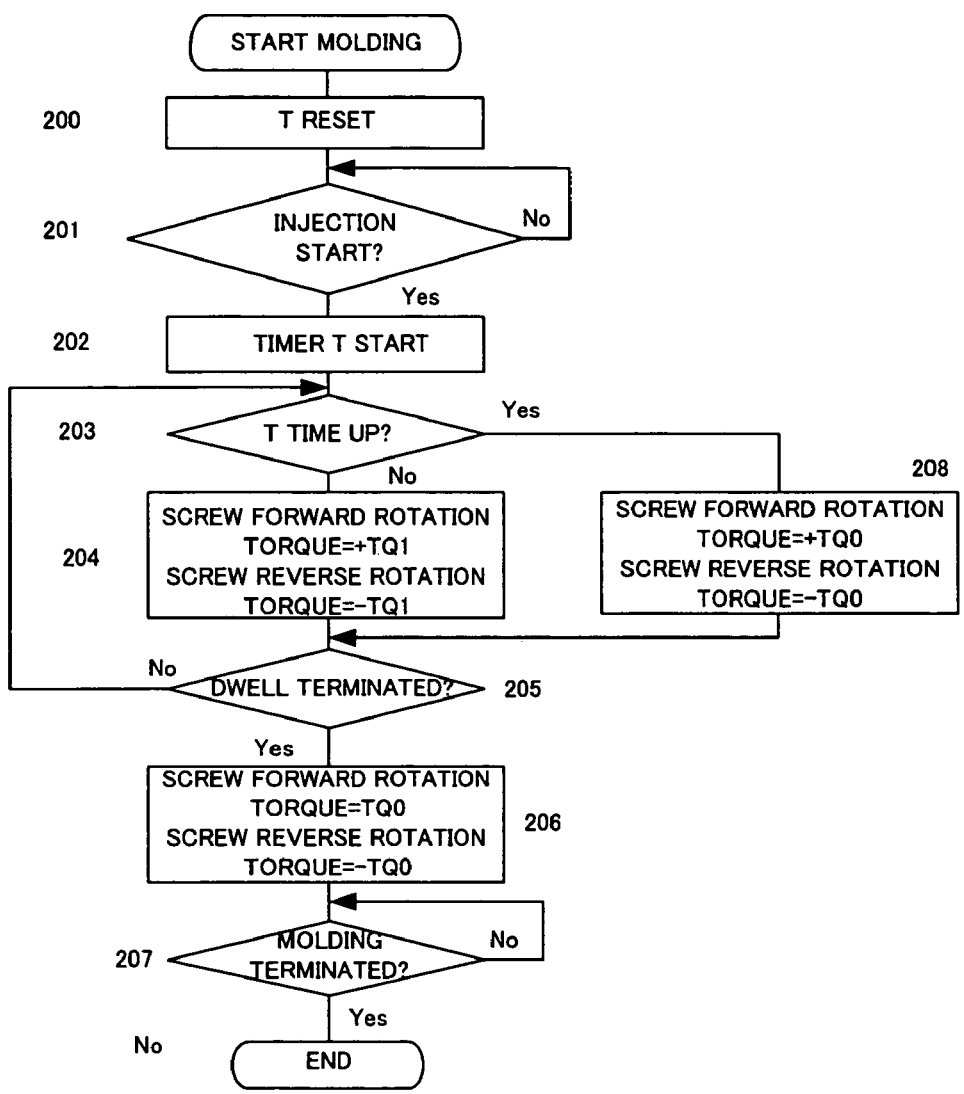
FIG. 11 is a flow chart showing another embodiment of the present invention in which closing of a resin path based on the check valve mechanism is not detected.

FIG. 11 shows a flow chart of processing that the processor 21 in this case performs. When a molding operation is started, the timer T is reset (step 200), and, waiting for commencement of injection (step 201), the timer T is started (step 202). Thus, it is judged whether or not the timer T has counted up the predetermined time (step 203). If the timer T has not counted up, current limited values in the direction of forward rotation and in the direction of reverse rotation of the metering servo motor 10 is set to small values (value substantially close to 0) "+TQ1" and "−TQ1" (step 204). Thereby, the metering servo motor 10 and the screw 1 to be rotationally driven by the servo motor 10 enters a freely rotatable state.

If the dwell has not been terminated (step 205), the sequence returns to step 203, and until the timer T has counted up the preset time, processing in steps 203, 204 and 205 is repeatedly carried out. Thus, when the timer T has counted up the preset time, so as to be able to output the full torque by releasing the torque limit on the metering servo motor 10, its limited value is returned to the maximum driving current value "+TQ0" and "−TQ0", and at this time, position deviation of a position loop for controlling the metering servo motor 10 is set to "0" (step 208).

Hereinafter, until the dwell is terminated, processing in steps 203, 208 and 205 is repeatedly carried out. Accordingly, after the timer T has counted up the preset time, the current limited value of the metering servo motor becomes the maximum value, and no moving command has been outputted to the metering servo motor. Therefore, the metering servo motor 10 operates so as to hold its rotational position to stop and fix the rotation of the screw 1. When the dwell is thus terminated (step 205), the current limited value of the metering servo motor 10 is set to the maximum driving current value, "+TQ0" and "−TQ0" (step 206) again to wait for completion of molding (step 207).

In each embodiment described above, timing whereat the screw rotation is fixed according to time elapsed from the commencement of injection has been determined, but this timing may be determined on the basis of the position of the screw 1 and an actual amount of rotation of the screw.

As described above, according to the present invention, it is possible to detect closing timing of the check valve at the time of injection without the aid of any special mechanism. Also, stable injection control can be acquired.

The invention claimed is:

1. An in-line screw type injection molding machine, comprising:
   screw rotation stop detection means for bringing a screw into a freely rotatable state from commencement of injection and detecting, after the injection, that the rotation of said screw has stopped; and
   screw position detection means for detecting a position of the screw when said screw rotation stop detection means detects a stop of rotation.

2. The injection molding machine according to claim 1, further comprising screw position correction means for correcting, on the basis of a screw position detected by said screw position detection means, the screw position that has been set in order to control an injection process.

3. The injection molding machine according to claim 1, further comprising setting means for arbitrarily setting timing whereat said screw is brought into the freely rotatable state.

4. The injection molding machine according to claim 1, further comprising means for limiting, to one direction, a direction of rotation of the screw that is brought into the freely rotatable state.

5. The injection molding machine according to claim 1, further comprising means for setting, to an arbitrary value, torque of rotation of the screw when it has been brought into the freely rotatable state.

6. An in-line screw type injection molding machine, comprising:
   means for bringing a screw into a freely rotatable state from commencement of injection; and
   means for fixing rotation of the screw again after said screw has been brought into the freely rotatable state.

7. The injection molding machine according to claim 6, further comprising means for arbitrarily setting timing whereat the screw is brought into the freely rotatable state and timing whereat the rotation of the screw is fixed again.

8. The injection molding machine according to claim 6, further comprising means for limiting, to one direction, the direction of rotation of the screw which is brought into the freely rotatable state.

9. The injection molding machine according to claim 6, further comprising means for setting, to an arbitrary value, torque of rotation of the screw when it has been brought into the freely rotatable state.

10. The injection molding machine according to claim 2, further comprising setting means of arbitrarily setting timing whereat said screw is brought into the freely rotatable state.

11. The injection molding machine according to claim 2, further comprising means for limiting, to one direction, the direction of rotation of the screw that is brought into a freely rotatable state.

12. The injection molding machine according to claim 2, further comprising means for setting, to an arbitrary value, torque of rotation of the screw when it has been brought into the freely rotatable state.

13. The injection molding machine according to claim 7, further comprising means for limiting, to one direction, the direction of rotation of the screw which is brought into the freely rotatable state.

14. The injection molding machine according to claim 7, further comprising means for setting, to an arbitrary value, torque of rotation of the screw when it has been brought into the freely rotatable state.

* * * * *

UNITED STATES PATENT AND TRADEMARK OFFICE
CERTIFICATE OF CORRECTION

PATENT NO. : 7,074,028 B2 Page 1 of 1
APPLICATION NO. : 10/743072
DATED : July 11, 2006
INVENTOR(S) : Hiroshi Watanabe et al.

It is certified that error appears in the above-identified patent and that said Letters Patent is hereby corrected as shown below:

Column 12, Line 16, change "of" to --for--.

Signed and Sealed this

Fourteenth Day of November, 2006

JON W. DUDAS
*Director of the United States Patent and Trademark Office*